United States Patent [19]

Levatter

[11] Patent Number: 4,927,231

[45] Date of Patent: May 22, 1990

[54] LIQUID FILLED FLEXIBLE DISTAL TIP LIGHT GUIDE

[75] Inventor: Jeffrey I. Levatter, San Diego, Calif.

[73] Assignee: Acculase Inc., San Diego, Calif.

[21] Appl. No.: 282,932

[22] Filed: Feb. 27, 1989

Related U.S. Application Data

[63] Continuation of Ser. No. 146,430, Jan. 21, 1988, abandoned.

[51] Int. Cl.$^5$ ............................................. G02B 6/20
[52] U.S. Cl. ............................ 350/96.32; 350/96.15; 350/96.20
[58] Field of Search ............... 350/96.10, 96.15, 96.20, 350/96.21, 96.29, 96.30, 96.32

[56] References Cited

U.S. PATENT DOCUMENTS

| | | | |
|---|---|---|---|
| 3,995,934 | 12/1876 | Nath | 350/96.1 |
| 4,009,382 | 2/1977 | Nath | 350/96.32 |
| 4,045,119 | 8/1977 | Eastgate | 350/96.32 |
| 4,201,446 | 5/1980 | Geddes et al. | 350/96.29 |
| 4,657,014 | 4/1987 | Edelman et al. | 350/96.15 |
| 4,697,870 | 10/1987 | Richards | 350/96.21 |

FOREIGN PATENT DOCUMENTS 0033514  2/1985  Japan ............................. 350/96.30

*Primary Examiner*—Frank Gonzalez
*Attorney, Agent, or Firm*—Pretty, Schroeder, Brueggmann & Clark

[57] ABSTRACT

An apparatus for transmitting high power laser energy through a flexible optical fiber comprising a relatively large solid optical fiber coupled to a relatively short segment of a flexible liquid optical fiber at the distal end of the solid optical fiber. The liquid fiber is a hollow tube filled with highly transparent liquid and is capable of transmitting high power laser energy while remaining flexible.

15 Claims, 1 Drawing Sheet

U.S. Patent  May 22, 1990  4,927,231
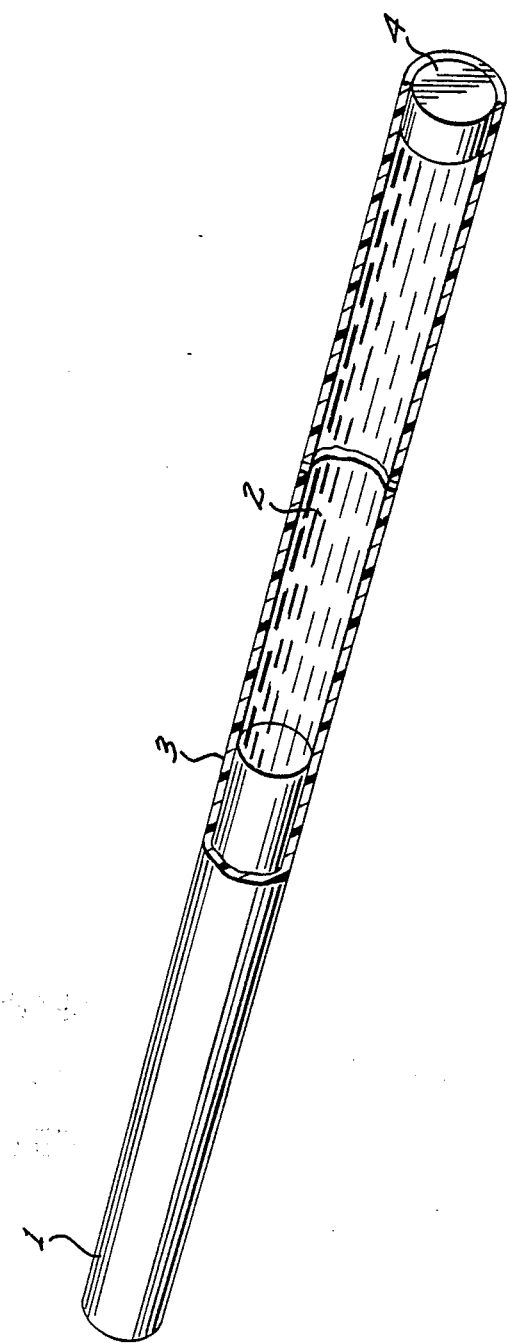

LIQUID FILLED FLEXIBLE DISTAL TIP LIGHT GUIDE

This application is a continuation of application Ser. No. 07/146,430 filed 1/21/88 (abandoned).

BACKGROUND OF THE INVENTION

1. Field of the Invention

This invention relates to an apparatus for providing laser energy through a light guide. More particularly, the invention relates to a solid optical fiber coupled at its distal tip to a flexible liquid light guide capable of transmitting high power laser energy.

2. Description of Related Art

Currently in the art, to obtain high power laser energy, a relatively large solid optical fiber approximately 200μ–1000μ in diameter must be used. A problem in using such large diameter fibers is that they are relatively inflexible, and thus cannot be used in many applications where the fiber must be threaded through a restricted, convoluted passageway. Smaller (e.g., 200μ diameter), more flexible fibers are generally incapable of providing the same high level of laser power, since the maximum permissible output power is inversely proportional to the square of the fiber diameter. When smaller fibers transmit a high level of light flux, they begin to break down. Flexible liquid light guides have been used in the past (U.S. Pat. No. 3,995,934 to Nath, for example), but suffer from relatively large power losses due to absorption of the laser energy by the long length of liquid in the light guide. Thus, there remains a need for an efficient, flexible light guide capable of transmitting high power laser energy.

SUMMARY OF THE INVENTION

The present invention provides high power laser energy through a flexible light guide. This object is achieved by a novel apparatus which couples a relatively large solid optical fiber to a relatively short, flexible liquid optical guide at the distal tip of the solid optical fiber. The liquid light guide consists of a flexible hollow tube which can be filled with a transparent liquid (such as high purity water) and is closed at its distal end by a transparent cap or plug (such as a quartz plug). The flexible liquid light guide is attached or bonded to the solid optical fiber and is capable of transmitting high power laser energy.

These and other features and advantages of the invention will become more apparent upon consideration of the accompanying detailed description and drawing.

BRIEF DESCRIPTION OF THE DRAWING

The FIGURE is a side view of a high power flexible liquid light guide coupled to a solid optical fiber in accordance with the present invention.

DETAILED DESCRIPTION OF THE INVENTION

FIG. 1 depicts an apparatus for transmitting high power laser energy through a flexible light guide. The apparatus includes a relatively large diameter solid optical fiber 1 coupled at its distal end to a relatively large diameter (compared to highly flexible solid optical fibers) liquid light guide 2. The other end of the optical fiber 1 is coupled to a source of laser energy (not shown).

The optical fiber may be made of any of a number of known materials, including fused silica or glass. The liquid light guide 2 is preferably a flexible hollow tube 3 filled with a liquid (such as high purity water) which is substantially transparent to the wavelength of laser energy employed, and which has a higher index of refraction than the surrounding tube 3. The tube 3 of the liquid light guide 2 may be made of any of a number of materials, such as silicone rubber. In the preferred embodiment, the liquid light guide 2 is approximately 10 cm in length. By limiting the length of the liquid light guide 2, less laser energy is lost by absorption. In the preferred embodiment, the inside diameter of the liquid light guide 2 is approximately equal to the diameter of the optical fiber 1. The relatively large diameter of the liquid light guide 2 reduces the light flux through the contained liquid and the light guide is therefore capable of transmitting greater laser energy compared to previous small-diameter solid optical fibers. Thus, the liquid light guide 2 has the advantage of being flexible while still having the capability of transmitting high power laser energy.

In one embodiment of the invention, the flexible tube 3 of the liquid light guide 2 is closed at its distal end by a transparent plug 4. The proximal end of the liquid light guide 2 may be fitted flush against the solid optical fiber 1 and bonded by adhesive, partial melting, or other means.

The term plug, as used in the description of the preferred embodiments, refers to any transparent cap, plug, or disk which can be bonded or attached to the liquid light guide 2 to retain the liquid within.

In another embodiment of the invention, the flexible tube 3 of the liquid light guide 2 is again closed at the distal end by a transparent plug 4. The proximal end of the tube 3 has an inside diameter equal to the diameter of the solid optical fiber such that the tube 3 can be friction fitted over the end of the solid optical fiber 1. This embodiment has the advantage of allowing the liquid light guide 2 to be disposable. This is particularly useful where the light guide may be used inside a body passageway.

In still another embodiment of the flexible light guide, a transparent plug 4 is fitted in the distal end of the flexible tube 3 and a second transparent plug is fitted approximately 1 cm inside the proximal end of the flexible tube. The liquid light guide tube 3 would then be fitted over the solid fiber 1 and secured by bonding, adhesive, partial melting, or other means. This embodiment has the advantage of allowing the liquid light guide to be filled with liquid in a separate operation, which in turn may allow for easier manufacture.

The foregoing description has been of certain presently preferred embodiments of the present invention. It will be appreciated by those skilled in the art that there are many modifications and variations of these described embodiments that remain within the scope of the present invention as claimed.

I claim:

1. An elongated light guide assembly for a high-power laser beam, comprising:
   an optical fiber having a solid core for transmitting a high-power laser beam, the optical fiber extending over a substantial majority of the elongated light guide assembly's length; and
   a liquid-filled flexible tube optically coupled to one end of the optical fiber, for transmitting the high-power laser beam transmitted to it by the optical fiber, wherein the liquid-filled flexible tube is substantially more flexible than is the optical fiber.

2. An elongated light guide assembly as defined in claim 1, wherein the liquid-filled flexible tube is bonded to one end of the optical fiber.

3. An elongated light guide assembly as defined in claim 1, wherein the liquid-filled flexible tube includes:
a flexible tube;
first and second transparent plugs located at opposite ends of the flexible tube, for sealing the tube's interior; and
a transparent liquid located in the tube's interior.

4. An elongated light guide assembly as defined in claim 3, wherein:
the flexible tube is formed of silicone rubber;
the first and second transparent plugs are formed of quartz; and
the transparent liquid is high-purity water.

5. An elongated light guide assembly as defined in claim 1, wherein:
the liquid-filled flexible tube includes a tube having an inside diameter approximately equal to the diameter of the optical fiber; and
the tube is fitted over a portion of one end of the optical fiber.

6. An elongated light guide assembly as defined in claim 1, wherein the liquid-filled flexible tube has a length of about 10 centimeters.

7. An elongated light guide assembly as defined in claim 1, wherein the liquid-filled flexible tube is substantially more absorptive of the high-power laser beam being transmitted than is the optical fiber.

8. An elongated light guide assembly as defined in claim 1, wherein the optical fiber has a diameter of approximately 200-to-1000 microns.

9. An elongated light guide assembly for transmitting a high-power laser beam, wherein a distal end of the light guide assembly has substantially greater flexibility than does the remaining portion of the light guide assembly, the light guide assembly comprising:
an optical fiber having a solid core for transmitting a high-power laser beam, the optical fiber extending over a substantial majority of the elongated light guide assembly's length and having a uniform diameter of approximately 200-to-1000 microns; and
a flexible light guide connected to a distal end of the optical fiber, for transmitting the high-power laser beam transmitted to it by the optical fiber, wherein the light guide includes a flexible tube and a light-transmissive liquid contained within the tube, wherein the flexible tube has a uniform diameter approximately the same as the diameter of the optical fiber, and wherein the flexible light guide is substantially more flexible than is the optical fiber.

10. An elongated light guide assembly as defined in claim 9, wherein the flexible light guide is bonded to the distal end of the optical fiber.

11. An elongated light guide assembly as defined in claim 9, wherein the flexible tube is fitted over the distal end of the optical fiber.

12. An elongated light guide assembly as defined in claim 9, wherein the flexible tube has an index of refraction less than the index of refraction of the transparent liquid contained within the tube.

13. An elongated light guide assembly as defined in claim 9, wherein:
the flexible tube is formed of silicone rubber; and
the transparent liquid is high-purity water.

14. An elongated light guide assembly as defined in claim 9, wherein the flexible light guide further includes first and second transparent plugs located at opposite ends of the flexible tube, for sealing the tube's interior.

15. An elongated light guide assembly as defined in claim 9 wherein the flexible tube has a length of about 10 centimeters.

* * * * *